United States Patent [19]

Edwards

[11] Patent Number: 4,674,025
[45] Date of Patent: Jun. 16, 1987

[54] MULTI-INVERTER CONTROL APPARATUS

[75] Inventor: Charles W. Edwards, Monroeville, Pa.

[73] Assignee: Westinghouse Electric Corp., Pittsburgh, Pa.

[21] Appl. No.: 871,047

[22] Filed: Jun. 5, 1986

[51] Int. Cl.[4] .............................................. H02M 1/12
[52] U.S. Cl. ........................................ 363/71; 363/43
[58] Field of Search ...................... 363/39, 40, 43, 65, 363/71; 323/212, 217

Primary Examiner—Peter S. Wong
Assistant Examiner—Judson H. Jones
Attorney, Agent, or Firm—C. M. Lorin

[57] ABSTRACT

In a multi-inverter system, inverters in series are swapped around in order to eliminate regenerative power due to phase difference between consecutive inverters in series.

4 Claims, 9 Drawing Figures 4,674,025

MULTI-INVERTER CONTROL APPARATUS

RELATED PATENT APPLICATION

The present invention is related to patent application Ser. No. 871,048 filed concurrently with this application, and entitled "High Voltage Modular Inverter". The cross-referenced patent application is hereby incorporated by reference.

BACKGROUND OF THE INVENTION

As disclosed in the cross-referenced patent application, it has been proposed to assemble in series a plurality of single-phase inverters in order to put together a high voltage modular multi-inverter system. It is also disclosed in the cross-referenced patent application to control the inverter modules in such modular multi-inverter system, either individually or in concert.

Single-phase inverter modules can also be connected in series to achieve harmonic cancellation. See for instance U.S. Pat. No. 4,063,143. With inverters connected in series, a problem arises when they are operated at different phase angles and the load current lags by more than one half the angle between the inverter operative phases. Assuming two inverters in series, when this situation occurs, the inverter which has a voltage leading the load current will regenerate, because the load current lags its associated voltage waveform by more than 90°, e.g. there is a component of active current which is negative. However, such regenerative power cannot be derived from the load, it will be taken from the other inverter which is lagging. The net power delivered to the load being the sum of the power outputted by both inverters, it will be the result of one positive output flow of power and one negative output flow of power. The latter, which is regenerative, should be returned toward the AC input lines of the converter-inverter. If this is not provided for, the DC link capacitor will be charging-up with the risk of damaging the inverter if not stopped in time.

The present invention provides a solution to this problem by implementing a simple and attractive control of inverters connected in series and operated with a phase shift between the inverter outputted voltages. This solution is more desirable than the practice known in the prior art of using inverters sharing a common DC link and an output transformer summing the operations, the regenerated power from the regenerating inverter being passed through via the DC link. The major objection here, is the use of output transformers because of the side effects for motor drive applications, especially variable frequency.

SUMMARY OF THE INVENTION

The invention relates to multi-inverter systems including at least a first and a second inverter having their output voltages connected in series.

The invention provides for exchanging the functions of said first and second inverters recurrently, thereby to prevent a phase shift between the output voltages from afffecting the operation.

Preferably, the inverter functions are exchanged by recurrently exchanging the controls between the respective inverters.

The invention is applicable to inverter system wherein a phase shift between inverters in series is intended, for instance in order to eliminate harmonics.

Recurrent exchanging of inverter functions according to the invention may be effected periodically, or asynchronously.

The invention is applicable to a plurality of inverters in series, in such case, recurrent function exchanging is effected by pairs of consecutive inverters in the string, and on a distributive and regular basis, by successive permutations.

DETAILED DESCRIPTION OF THE INVENTION

Figure 1:
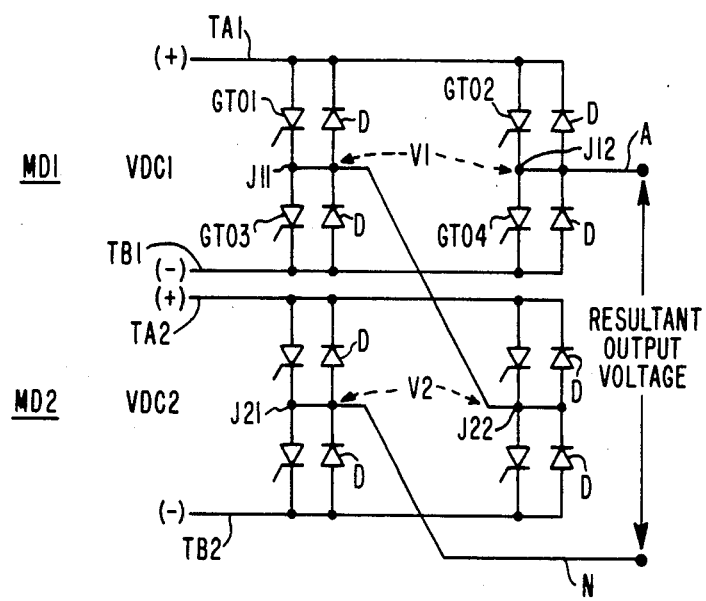
FIG. 1 shows an arrangement in series of two inverters illustrated in the situation of a single-phase output.

Referring to FIG. 1, two inverter modules MD1 and MD2, as disclosed in the incorporated by reference copending application are shown with their output voltages $V_1$, $V_2$ connected in series. Only two modules are shown, for the sake of simplicity. For illustration purpose, voltages $V_1$, $V_2$ are connected to the outside, over with the neutral line N, for $V_2$, the other with the phase line A, for $V_1$, the junction points being $J_{11}$ in inverter MD1, and $J_{22}$ in inverter MD2. Module MD1 includes four GTO devices connected in pairs (GTO1, GTO3), (GTO2, GTO4), between DC link terminals $TA_1$, $TB_1$, the junction points being $J_{11}$ and $J_{12}$ for the respective poles. The same type of module exist with module MD2, the DC link terminals being $TA_2$, $TB_2$ and the junction points $J_{21}$, $J_{22}$.

The GTO devices have mounted in antiparallel fashion diodes D for each pair, as generally known. The DC link voltages of the voltage sources are $V_{DC1}$ and $V_{DC2}$ for the respective modules MD1, MD2.

Voltages $V_1$, $V_2$ outputted by the respective inverters are square waves according to the duty-cycle of the control circuits GD1, GD2 of the GTO devices for the respective modules. Thus the frequency is selected. Alternatively $TA_1$, or $TB_1$, are connected to $J_{12}$, and alternatively $TA_2$ or $TB_2$ are connected to $J_{21}$. Similarly, ($TA_1$ or $TB_1$) and $TA_2$, or $TB_2$ are alternatively connected to $J_{11}$ and $J_{22}$ which are connected together. Therefore, the resultant voltages $V_1$ and $V_2$ can reach either $+(V_{DC1}+V_{DC2})$ or $-(V_{DC1}+V_{DC2})$. This is general knowledge.

Figure 2:
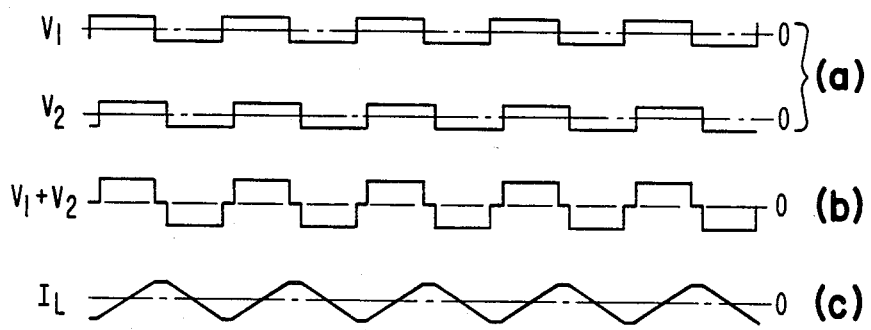
FIG. 2 illustrates with curves the individual and resultant voltages, and the load current in the instance of FIG. 1.

It is assumed that control of modules MD1 and MD2 is effected with a certain phase shift as shown by curves $V_1$ and $V_w$ under (a) on FIG. 2. Therefore, the resultant voltage ($V_1+V_2$) is a quasi-square curve. Assuming an inductive load between line A and line N, the load current will increase linearly when ($V_1+V_2$)=+($V_{DC1}+V_{DC2}$). It will not change when ($V_1+V_2$)=0, and it will decrease linearly when ($V_1+V_2$)=−($V_{DC1}+V_{DC2}$). This is shown by curve (c) in FIG. 2.

Figure 3:
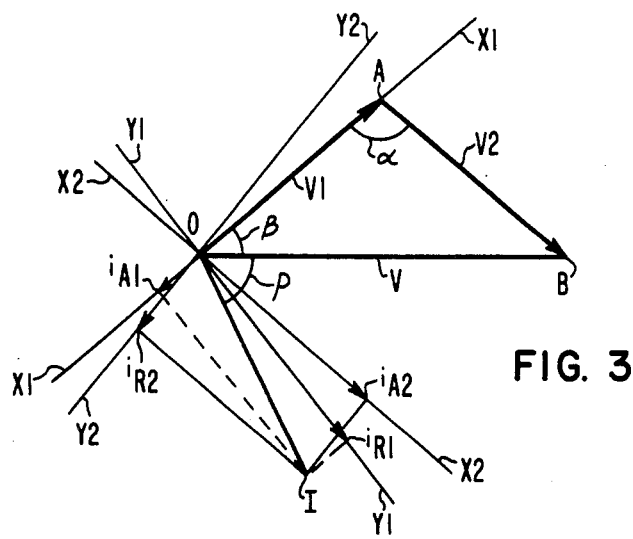
FIG. 3 is a vectorial representation of the regenerative effect on one inverter of a phase shift between the individual inverters of FIGS. 1 and 2.

Such operation with two single phase inverters connected in series at different phase angles may be done for harmonic cancellation, or for voltage regulation. When this is performed, though, regeneration might occur as shown in FIG. 3. $V_1$ and $V_2$ are two vectors at an angle $\alpha$ resulting from the aforesaid phase shift difference in controlling MD1 and MD2. The resultant voltage $V_{AN}$ is the vector V, joining the origin of $V_1$ and the extremity of $V_2$. Rectangular coordinates $X_1$, $Y_1$ are shown with vector $V_1$ from the origin O on the abscissa. $X_2$, $Y_2$ are rectangular coordinates chosen with the nine origin O for $V_2$, with vector $V_2$ parallel to the abscissa thereof. Assuming a load current vector I as shown, namely with a lagging angle P relative to V, such load current is oriented relative to vectors $V_1$ and $V_2$ differently, as shown. It appears that with regard to MD1, the load current lags its voltage $V_1$ by more than 90°. In other words, there is a negative component (vector $I_{A1}$) representing active current and, therefore, real power ($I_{A1} \times V_1$) which is regenerative power. In other words, inverter MD1 (output $V_1$ in association with load current I) is leading by more than 90°. However, the inverter will be unable to regenerate power back to the input side, because the DC link circuit does not allow this, unless special provision is made for returning the regenerated power to the input lines. The other inverter (MD2) is lagging and delivers real power to the load. The net power delivered to the load, namely the sum of the power from MD1 and MD2 is the result of a power flow to the load (positive) and a negative power flow.

Unless, negative power is returned to the AC input, the DC link capacitor will charge-up, and unless the inverter is stopped, there will be a failure of the inverter.

One solution with inverters operated with different phase angles, while sharing a common DC link, is to use output transformers effecting summation, so that the regenerated power from the regenerating inverter can be passed to the power source inverter via the DC link. However, output transformers have many undesirable effects in motor drive applications.

Figure 4:
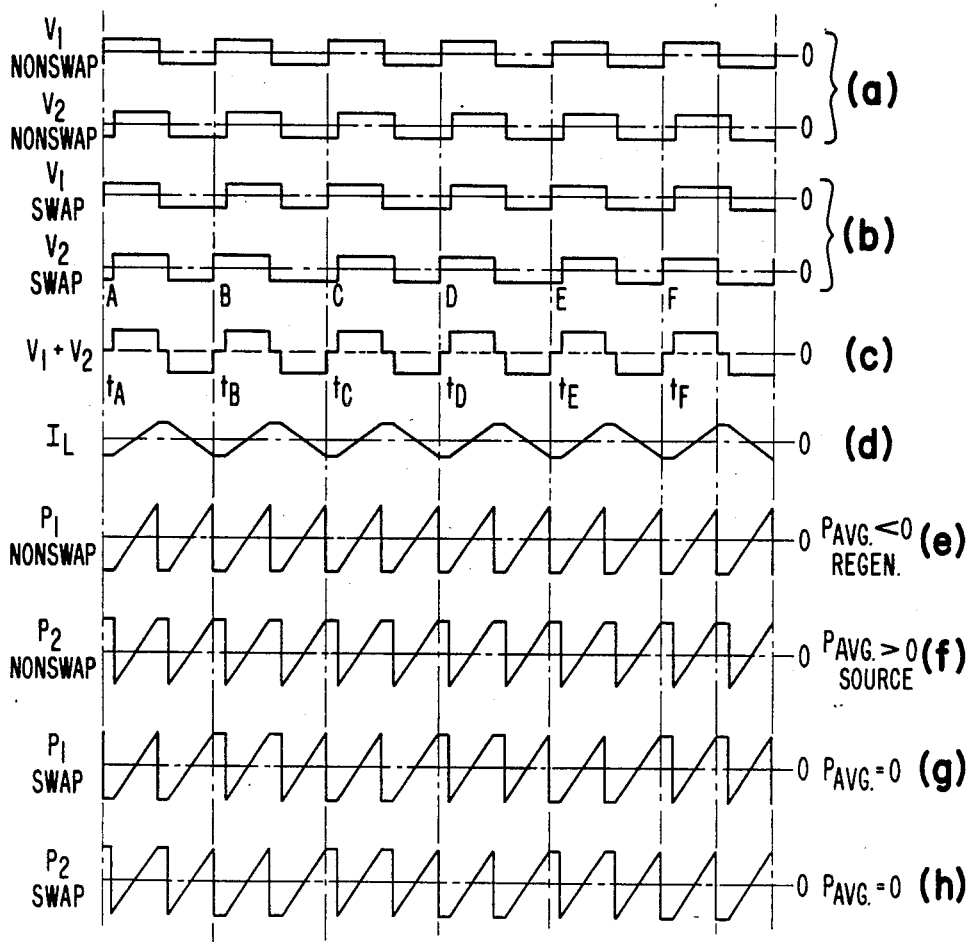
FIG. 4 illustrates with curves a method of elimination of the regenerative effect of FIG. 3 according to the present invention.

Considering FIG. 4, curves (a) show the two voltages $V_1$ and $V_2$, like in FIG. 2, when there is a phase shift between the output squared voltage waves. In accordance with the present invention, the roles of MD1 and MD2 are alternately reversed so that the leading inverter becomes a lagging inverter and, conversely, successively between AB, then between BC, then between CD etc., as shown with curves (b) for $V_1$ and $V_2$. Thus, if at time $t_A$, the front edge of $V_1$ precedes the front end of $V_2$, at time $t_B$ suddenly, the front edge of $V_2$ is preceding the front edge of $V_1$. Similarly, at $t_C$ the front edge of $V_1$ reverts to leading the front edge of $V_2$, while at $t_D$ again, the front edge of $V_2$ leads relative to the front edge of $V_1$, and so on. As a result, if we compare the current $I_L$ under (d) with the current $I_L$ of FIG. 2, the linear portions, are shorter, since the higher and lower plateaux of ($V_1+V_2$) (under (c)) are shorter. Power is the product of $I_L$ by $V_1$ for $P_1$ and of $I_L$ by $V_2$ for $P_2$. Curves (e) and (f) show $P_1$ and $P_2$ in the case of FIG. 2, whereas curves (f) and (g) show $P_1$ and $P_2$ when swapping the functions of MD1 and MD2, like with curves (b), (c) and (d). It appears that inverter MD1 is regenerative under curve (e) because the average of $P_1$ is negative due to the horizontal portion following the falling edge of $V_1$, when $I_L$ is constant. In the same way, for $P_2$ (curve (f)) the average of $P_2$ is positive for inverter MD2. Swapping the roles of MD1 and MD2 results, as shown by curves (g) and (h) in alternating the positive and negative average of $P_1$ and $P_2$ with an overall average which is zero from A through F. It is understood in the instance of FIG. 4 that the load is assumed to be fully inductive, (which is the worst situation encountered). Therefore $P_{AVG}=0$ for $P_1$ and $P_2$ when the invention swapping method is applied. It is also understood that for the series inverter system with MD1 and MD2, $P_1+P_2$ is the total power transmitted to the load; while the swapping method forces $P_{1AVG}$ to be equal to $P_{2AVG}$ and conversely.

Figure 5:
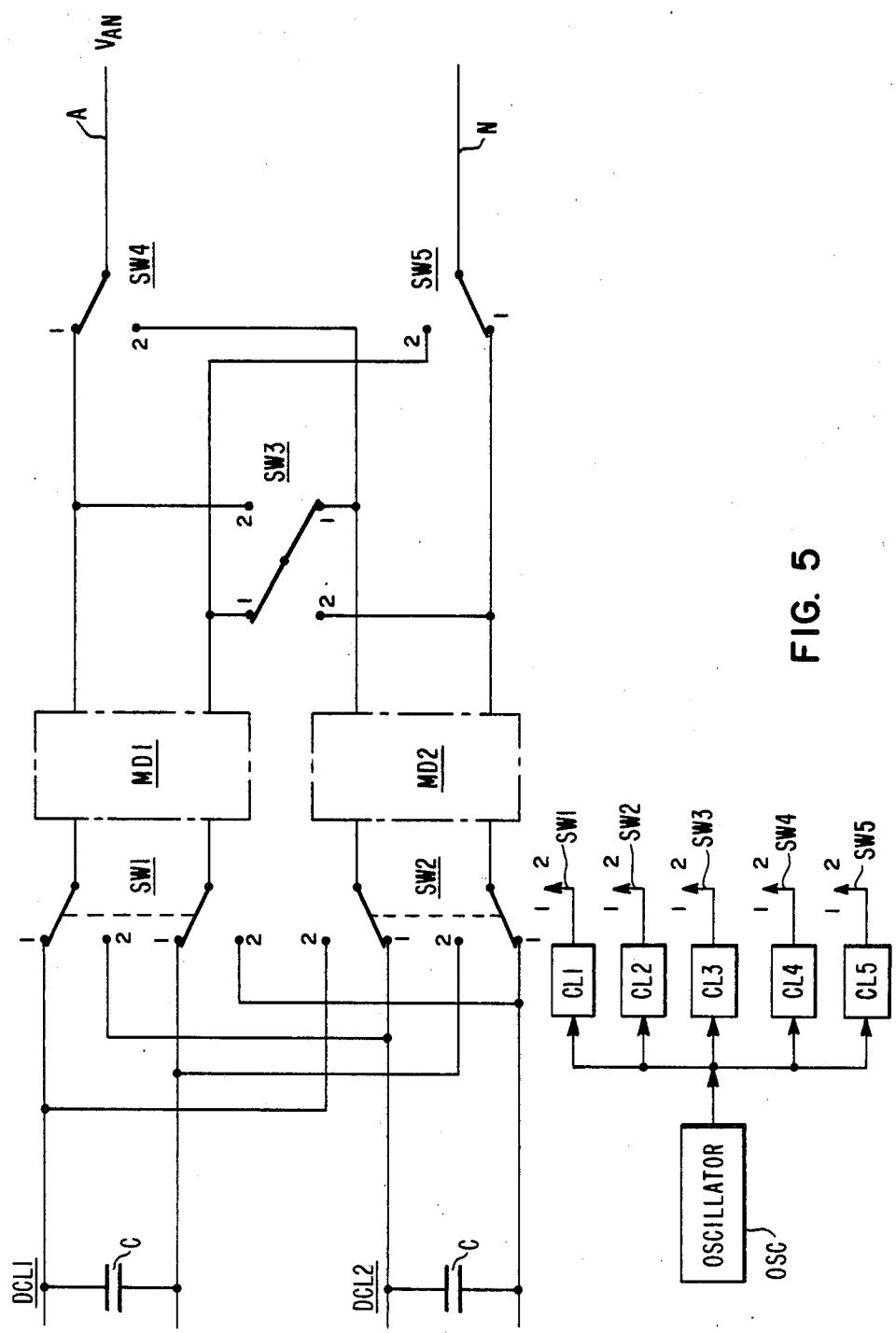
FIG. 5 is a block diagram illustrating the implementation of the method of FIG. 4 for the purpose of illustration only.

FIG. 5 is a block diagram illustrating an implementation of the invention by exchanging the inputs and the outputs of inverters MD1, MD2, without changing their control. This requires switches SW1 for MD1, SW2 for MD2 at the input side, namely etween DC link terminals $TA_1$, $TB_1$ for MD1, $TA_2$, $TB_2$ for MD2, so that ($TA_1$, $TB_1$) in position #1 feeds MD1 while ($TA_2$, $TB_2$) feeds MD2, and in position #2 ($TA_2$, $TB_2$) feeds MD1 while ($TA_1$, $TB_1$) feeds MD2. On the AC side, similarly, the phase line A sees the phase output line from MD1 and in position #2 it sees the phase output line from MD2. The neutral output line from MD2 goes to the neutral line N when SW5 is in position 190 1, whereas, it is the neutral output line from MD1 which goes to line N when SW5 is in position #2. At the same time, switch SW3 interchanges the line joining V and $V_2$ at the junction of the two inverters in series. The lower end of $V_1$ is connected to the upper end of $V_2$ by SW3 in position #1, whereas, the lower end of $V_2$ is connected to the upper end of $V_1$ when SW3 is in position #2. On oscillator OSC controls, coils CL1-CL5 which via lines 10-14 control the arms of switches SW1-SW5, respectively. This is shown for the purpose of explanation only.

Figure 6A:
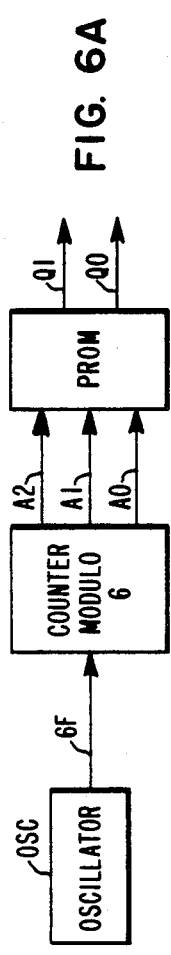
FIG. 6A shows a digital implementation of a phase shift between the control operations of the two inverters of FIGS. 1 and 2.
Figure 7A:
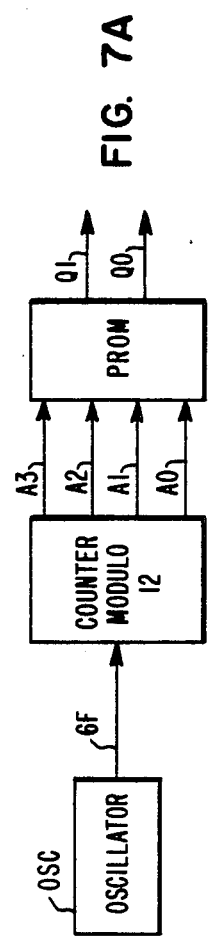
FIGS. 7A and 7B show a digital implementation of the method achieving the effect of FIG. 4 with the control waveform and the inerter connection of FIGS. 1 and 4.

Referring to FIGS. 6A, 7A, digital control of MD1 and MD2 is shown in the instance of FIG. 2 and in the instance of FIG. 4, respectively.

Referring to FIG. 6A, an oscillator OSC generates a frequency signal at size time the fundamental frequency. A counter CNT generates three binary bits $A_0$, $A_1$, $A_2$ which represent the address of a PROM device containing the following data:

TABLE I

| LOC BIN | LOC DEC | $Q_1$ | $Q_0$ |
|---|---|---|---|
| 000 | 0 | 1 | 0 |
| 001 | 1 | 0 | 0 |
| 010 | 2 | 0 | 0 |
| 011 | 3 | 0 | 1 |
| 100 | 4 | 1 | 1 |
| 101 | 5 | 1 | 1 |

The outputs of the PROM are $Q_0$ and $Q_1$ which represent the states of the controlling waveform for MD1 and MD2, like curves (a) and (b) of FIG. 8.

Figure 6B:
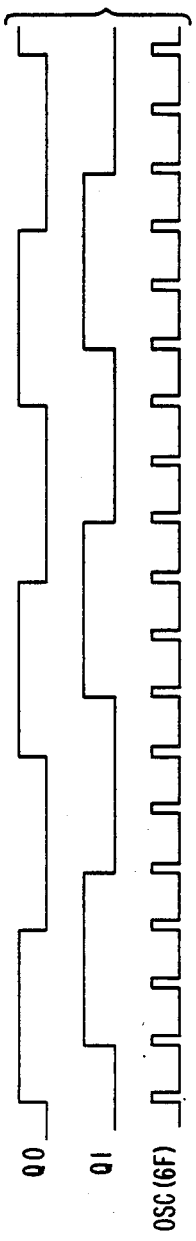
FIG. 6B illustrates with curves the signals involved therein.

FIG. 6B shows $Q_0$ and $Q_1$ in time relation to the pulsing signal from the oscillator OSC.

Similarly, but in the instance of swapping the control of the inverters MD1, MD2, an oscillator OSC is shown in FIG. 7A generating a pulse train at six times the fundamental frequency F. A counter generates on lines A0–A3 the four bits characterizing binary numbers for the address of a PROM device. The PROM contains data representing $Q_0$ and $Q_1$ according to the following table:

TABLE II

| LOC BIN | LOC DEC | $Q_1$ | $Q_0$ |
|---|---|---|---|
| 0000 | 0 | 1 | 0 |
| 0001 | 1 | 0 | 0 |
| 0010 | 2 | 0 | 0 |
| 0011 | 3 | 0 | 1 |
| 0100 | 4 | 1 | 1 |
| 0101 | 5 | 1 | 1 |
| 0110 | 6 | 0 | 1 |
| 0111 | 7 | 0 | 0 |
| 1000 | 8 | 0 | 0 |
| 1001 | 9 | 1 | 0 |
| 1010 | 10 | 1 | 1 |
| 1011 | 11 | 1 | 1 |

Figure 7B:
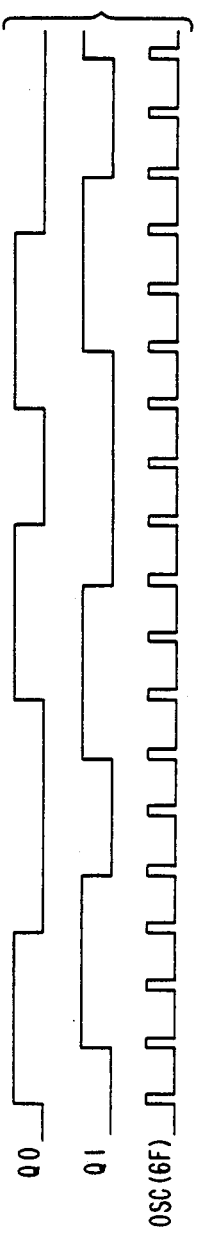

FIG. 7B shows the waveform $Q_0$, $Q_1$ in time relation with the oscillator pulse train. $Q_0$ and $Q_1$ are no longer exhibiting a regular occurrence of a front edge and a trailing edge with $Q_0$ leading constantly $Q_1$ as in FIG. 6B. Now, alternatively $Q_0$ will lead $Q_1$ and $Q_1$ will lead $Q_0$, much like with curves (b) of FIG. 4.

I claim:

1. In a multi-inverter system including at least two inverters connected in series for outputting a compound voltage, the combination of:
   means for controlling said inverters to establish a predetermined phase shift between the respective output voltages of said inverters; and
   means responsive to a recurrent triggering signal for exchanging said inverters under said controlling means, whereby the average power derived from each inverter as a function of time is balanced out.

2. The system of claim 1 with said triggering signal responsive means being effective to exchange the effect of said controlling means upon said inverter.

3. The system of claim 2 with said triggering signal being periodical.

4. The system of claim 3 with said triggering signal being asynchronously applied.

* * * * *